United States Patent Office 2,852,489
Patented Sept. 16, 1958

2,852,489

THERMOPLASTIC AMINOPLASTS PREPARED FROM TOLUENE SULFONAMIDE AND A METHYLOL AMINO COMPOUND

Thomas Anas, Springfield, Mass., assignor to Monsanto Chemical Company, St. Louis, Mo., a corporation of Delaware No Drawing. Application January 12, 1954
Serial No. 403,643

6 Claims. (Cl. 260—67.6)

This invention relates to new thermoplastic compositions. More particularly the invention relates to permanently thermoplastic aminoplasts.

The condensation products of toluene sulfonamide with formaldehyde are brittle thermoplastic resins which have been used in combination with melamine or urea formaldehyde condensates to plasticize the latter. The plasticization action is dependent on the inter-reaction of methylol groups on both the toluene sulfonamide condensate and the melamine or urea condensate. The products of such a reaction are thermosetting.

One object of this invention is to provide a new thermoplastic composition.

A further object of this invention is to modify toluene sulfonamide with melamine or urea formaldehyde condensates without rendering the composition thermosetting.

These and other objects are attained by reacting toluene sulfonamide with a formaldehyde derivative of an amino derivative such as melamine or urea.

The following examples are given in illustration and are not intended as limitations on the scope of this invention. Where parts are mentioned they are parts by weight.

*Example I*

Heat 3 mols of toluene sulfonamide to at least 105° C. at which temperature the material becomes fluid. Then add to the fluid material, 1 mol of trimethylol melamine while raising the temperature to about 140° C. The addition should be made quite slowly with constant vigorous agitation. Rapid addition or slow agitation will result in serious foaming of the reaction mixture. The reaction between the toluene sulfonamide and the methylol melamine is practically instantaneous so that it is substantially completed shortly after the last addition of the methylol melamine. The end of the reaction is determined by the disappearance of the foam. The reaction mixture can then be cooled. It is useful as a potting compound. The product is permanently thermoplastic and can be remelted and recast as desired. Attempts to render it thermosetting by incorporation of hexamethylene tetramine, paraform, etc. gave negative results.

*Example II*

Heat 2 mols of toluene sulfonamide to about 140° C. and add thereto 1 mol of dimethylol urea. The addition should be made slowly with constant vigorous agitation until all foaming ceases. The reaction mixture is then cooled to obtain a brittle clear permanently thermoplastic resin. The product will not thermoset even with the addition of formaldehyde or derivatives thereof such as paraform, hexamethylene tetramine, etc. It is useful as a matrix for dyes.

The toluene sulfonamide may be either the ortho or para isomer or a mixture thereof. It should be used as such and not as a condensation product with formaldehyde. The amount of toluene sulfonamide should be equivalent on a molar basis with the number of methylol groups on the formaldehyde-amine condensate. Thus with trimethylol melamine, three mols of toluene sulfonamide should be used per mol of trimethylol melamine.

The formaldehyde-amino condensates which are operative are the initial condensation products of formaldehyde with polyamino derivatives of the class consisting of urea, thiourea, dicyandiamide, and the polyamino 1,3,5-triazines of which melamine is the most commonly used compound. Other aminotriazines such as ammeline, N-aryl melamines such as N-phenyl melamine and N-alkyl melamines such as N-ethyl melamine may be used. If desired a mixture of these compounds may be used. These condensates are well-known materials and are prepared by reacting the polyamino compounds with formaldehyde under carefully controlled pH conditions, the reaction being stopped as soon as the methylol compounds are formed so that a minimum of higher molecular weight condensates are present. In this reaction, at least one mol of formaldehyde is used per polyamino compound and there may be used as many mols of formaldehyde as there are active hydrogen atoms attached to the amino nitrogen of the polyamine compound. If all of the active hydrogens are to be reacted with formaldehyde, an excess of formaldehyde is useful in controlling the reaction. Any excess of formaldehyde should be removed before the reaction with the toluene sulfonamide.

The reaction between the toluene sulfonamide and the formaldehyde polyamino condensate should be carried out with considerable care. The toluene sulfonamide should first be melted in the absence of solvents until it is fairly fluid. A temperature of at least 105° C. is necessary to melt the toluene sulfonamide and it becomes quite fluid and easily workable at 140° C. The methylol amino compound should be added quite slowly because the reaction is practically instantaneous and a large amount of foam is formed. By slow addition accompanied by vigorous agitation the amount of foaming is minimized. The agitation should be continued after the last addition of methylol amino compound until the foam disappears. The reaction is then complete. At temperatures above 160° C. the reaction is too vigorous for adequate control.

The products are permanently thermoplastic and can be remelted and reformed without degradation thereof. When in the molten form, conventional additives such as pigments, dyes, lubricants, fillers, other resins, etc. may be added. The products are compatible with urea resins, melamine resins, phenolic resins, etc. in which they act as flow promoters.

What is claimed is:

1. A permanently thermoplastic composition as prepared by heating toluene sulfonamide to a temperature of from 105–160° C. until it is fluid and while maintaining said temperature adding slowing with vigorous agitation a methylol amino compound; the amount of toluene sulfonamide being equivalent on a molar basis to the number of methylol groups on the methylol amino compound and the methylol amino compound being taken from the group consisting of the formaldehyde condensation products of urea, thiourea, dicyandiamide and polyamino 1,3,5-triazines essentially free of unreacted formaldehyde.

2. A permanently thermoplastic composition as prepared by adding 1 molar proportion of trimethylol melamine to 3 molar proportions of fluid toluene sulfonamide at a temperature of from 105–160° C., the addition being made slowly and accompanied by vigorous agitation.

3. A permanently thermoplastic composition as prepared by adding 1 molar proportion of dimethylol urea to 2 molar proportions of fluid toluene sulfonamide at a temperature of from 105–160° C., the addition being made slowly and accompanied by vigorous agitation.

4. A process for preparing a permanently thermoplastic composition which consists of heating toluene sulfonamide to a temperature of from 105–160° C. until it is fluid and while maintaining said temperature adding slowly with vigorous agitation a methylol amino compound; the amount of toluene sulfonamide being equivalent on a molar basis to the number of methylol groups on the methylol amino compound and the methylol amino compound being taken from the group consisting of the formaldehyde condensation products of urea, thiourea, dicyandiamide and polyamino 1,3,5-triazines essentially free of unreacted formaldehyde.

5. A process for preparing a premanently thermoplastic composition which consists of adding 1 molar proportion of trimethylol melamine to 3 molar proportions of fluid toluene sulfonamide at a temperature of from 105–160° C., the addition being made slowly and accompanied by vigorous agitation.

6. A process for preparing a permanently thermoplastic composition which consists of adding 1 molar proportion of dimethylol urea to 2 molar proportions of fluid toluene sulfonamide at a temperature of from 105–160° C., the addition being made slowly and accompanied by vigorous agitation.

References Cited in the file of this patent

UNITED STATES PATENTS

| | | |
|---|---|---|
| 1,908,159 | Moss et al. | May 9, 1933 |
| 2,325,375 | D'Alelio | July 27, 1943 |
| 2,545,716 | Thompson | Mar. 20, 1951 |